United States Patent
Ulrich et al.

(10) Patent No.: US 6,472,104 B1
(45) Date of Patent: Oct. 29, 2002

(54) SOLID HYBRID POLYMER ELECTROLYTES

(76) Inventors: Ralph Ulrich, Am Müllerwäldchen 19, 55122 Mainz (DE); Josef W. Zwanziger, Dept. of Chemistry, Indiana University, Bloomington, IN (US) 47405; Susan de Paul, Philipp-Wasserburg-Strasse 73a, 55122 Mainz (DE); Hans Wolfgang Spiess, Grillenweg 8, 55128 Mainz (DE); Ulrich Wiesner, 130 Sears St., Ithaca, NY (US) 14580

( * ) Notice: Subject to any disclaimer, the term of this patent is extended or adjusted under 35 U.S.C. 154(b) by 0 days.

(21) Appl. No.: 09/528,988

(22) Filed: Mar. 20, 2000

(51) Int. Cl.[7] .................................................. H01M 6/14
(52) U.S. Cl. ...................... 429/302; 429/304; 429/306; 429/307; 429/313; 429/319; 429/341
(58) Field of Search ....................... 429/304, 306, 429/307, 313, 319, 341, 302

(56) References Cited

U.S. PATENT DOCUMENTS 6,159,389 A * 12/2000 Miura et al. ................ 252/62.2

* cited by examiner

Primary Examiner—Carol Chaney
Assistant Examiner—Dah-Wei Yuan
(74) Attorney, Agent, or Firm—Arent Fox Kintner Plotkin & Kahn, PLLC

(57) ABSTRACT

The invention relates to a process for preparing a solid organic-inorganic hybrid polymer electrolyte containing lithium ions. The product shows high strength conductivity and lithium transference values. Further, the product can be self-organized into nanometer scale plates and rods paving the way to making lithium conducting cables for example and hence batteries of nanometer size.

27 Claims, 3 Drawing Sheets

[ppm FROM TMS]

[ppm FROM 1 M AlCl$_3$]

SOLID HYBRID POLYMER ELECTROLYTES

DESCRIPTION

Figure 1:
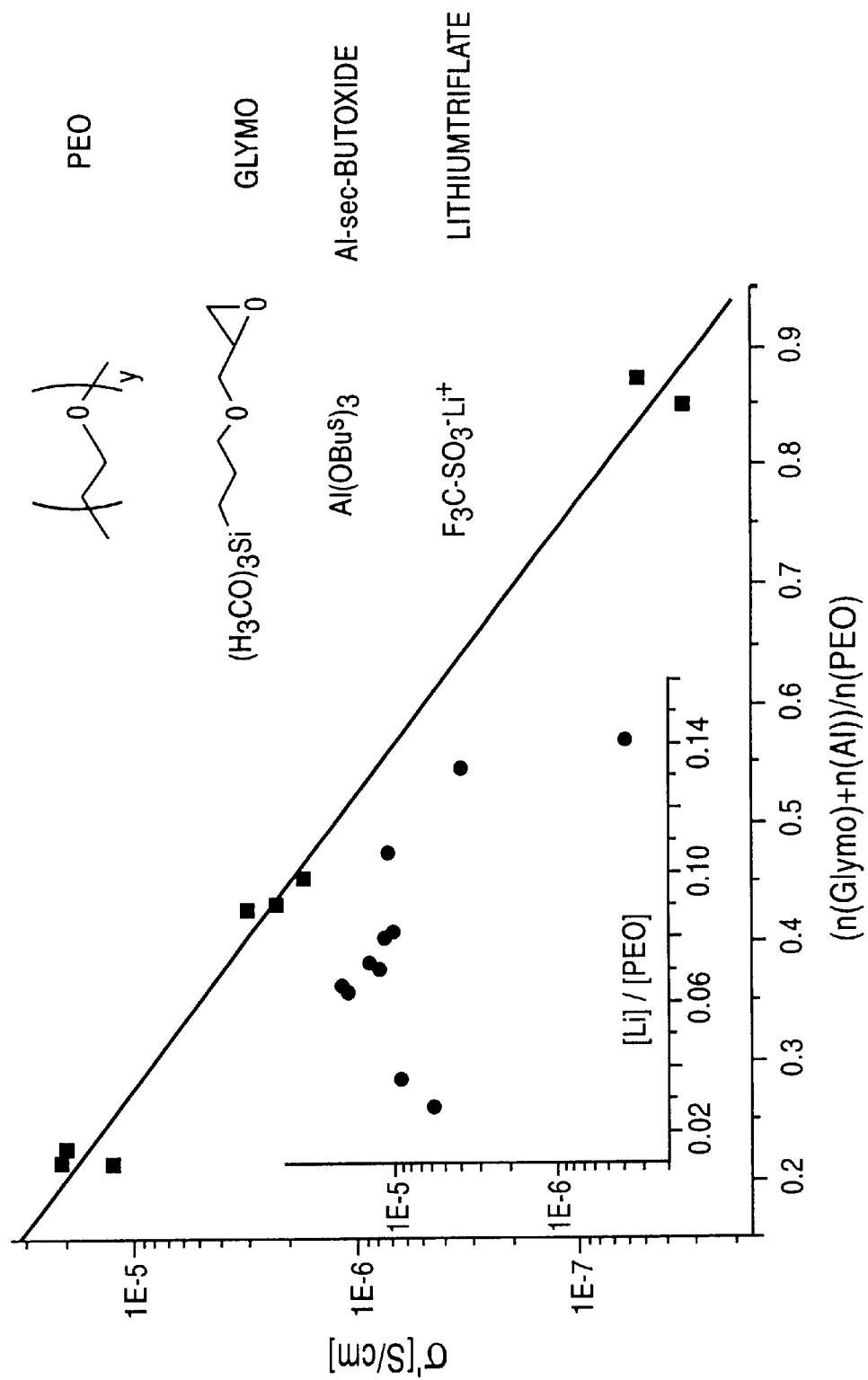

The invention relates to a process for preparing a, solid organic-inorganic hybrid polymer electrolyte containing lithium ions. The product shows high strength, conductivity and lithium transference values. Further, the product can be self-organized into nanometer scale plates and rods paving the way to making lithium conducting cables for example and hence batteries of nanometer size.

The good conductivity in polymer electrolytes occurs essentially because their glass transition temperatures $T_g$ are below ambient. Therefore, the mobility of both the ions and the polymer segments is high, and indeed polymer segmental motion is critical to good conductivity in these materials (Shriver & Bruce, Polymer electrolytes I: general principles. In: Solid State Electrochemistry, Bruce, P. G., ed., Cambridge 1997). PEO is excellent as a polymer host because, its $T_g$ is low (−40° C.), and it coordinates cations well enough to dissolve lithium salts (lightfoot et al., Science 262 (1993), 883). To be practical as an electrolyte, however, the resulting material must be stabilized against crystallization without sacrificing conductivity and without degrading its mechanical properties.

Composites have been developed recently that address these issues in different ways (Meyer, Adv. Mater. 10 (1998), 439; Croce et al., Nature 394 (1998), 456–458; Gianellis, Adv. Mater. 8 (1996), 29–35; Quartarone et al., Solid St. Ionics 110 (1998), 1–14). One approach is to cross-link the polymer, which suppresses crystallization and improves mechanical performance. The disadvantage of this approach is that $T_g$ is raised, so that the conductivity at ambient temperature is reduced. The cross-linked material can be additionally plasticized, but usually the resulting gels are of modest electrochemical stability and many of the mechanical advantages are lost. A different, synthetically challenging, approach is to graft ethylene oxide oligomers onto stiff polymer backbones (Meyer (1998), supra). A layered architecture with excellent mechanical properties and supressed PEO crystallization results, but with marginal electrochemical stability.

A layered structure is also achieved in polymer-inorganic intercalate materials, which have the additional advantage of fixed counterions, and therefore a high transference number for the cations. Such intercalates have to been made with both PEO (Gianellis (1996), supra; Lemmon et al., Electrochim. Acta 40 (1995). 2245–2249) and poly-phosphazenes (Hutchison at al., Chem. Mater. 8 (1996), 1597–1599), a problem with this approach is the anisotropy of the resulting conductivity. The recently synthesized siloxyaluminate polymers represent a potentially major is improvement in this area, since they appear to yield isotropic materials (Rawsky et al., Chem. Mater. 6 (19941, 2208–2209; Fujlnami et al., Chem. Mater. 9 (1997), 2236–2239). Even when the counterions are not fixed, addition of Lewis acid sites greatly improves the cation transference number (Croce et al., (1998), supra).

Lee et al. (Mol. Cryst. Liq. Cryst. 294 (19971, 229–232) describe processes for the sol-gel preparation of organic-inorganic hybrid polymer electrolytes and their electrochemical characterizations. The polymer electrolytes are prepared based on low molecular weight poly(ethylene glycol), lithium salts and an inorganic matrix produced by a sol-gel process of tetraethoxysilane and a precursor which was synthesized by the reaction of monomethoxy terminated poly(ethylene glycol) and 3-isocyanatopropyltriethoxysilane. Disadvantages of this product are, besides the demanding chemistry, that the silica network is based on tetraethoxysilane that does not provide any sort of Lewis acid site. Therefore the transference number is expected to be low. Furthermore, the modulus of the materials presented will be low because no network hardener like an aluminum compound is present. It will also be difficult to achieve a homogeneous distribution of silica within the sample.

It was therefore an object of the invention to provide a process for preparing a solid hybrid polymer electrolyte which avoids at least some of the disadvantages of the prior art.

This problem is solved by means of a process for preparing a solid hybrid polymer electrolyte comprising the steps:

a) forming a mixture comprising at least one silicon-containing precursor and at least one aluminum-containing precursor wherein said precursors can be reacted to give an organic-inorganic hybrid composite, b) reacting the mixture from a) whereby a sol is formed by reaction of the precursors.

c) adding a polyalkylene oxide-containing polymer and a lithium salt to the mixture from step a) and/or to the sol from step b) and d) reacting the mixture from c) whereby a solid organic-inorganic hybrid polymer electrolyte is obtained.

According to the invention a mixture is first formed. which comprises at least one silicon-containing precursor and at least one aluminum-containing precursor. The precursors used may be any desired substances which can be reacted to give an organic-inorganic hybrid composite.

The silicon-containing precursor is preferably a functionalized orthosilicate comprising at least one Si—C bond. More preferably, the silicon-containing precursor is a compound of the formula (I)

$$(R')_n Si(OR)_m \qquad (I)$$

wherein each R' is independently a straight-chain or branched $C_1$–$C_{10}$ alkyl group containing a compatibilizing functionality, wherein said compatibilizing functionality is capable of interacting with a polyalkylene oxide-containing polymer, each R is independently a straight-chain or branched, substituted or unsubstituted $C_1$–$C_8$, preferably $C_1$–$C_4$ alkyl group, e.g. methyl or ethyl, n is 1 or 2 and m is 3 or 2, with the proviso that n+m=4.

Preferably, the compatibilizing functionality is capable of forming oligoalkyleneoxy moieties, particularly oligoethyleneoxy moieties bound to silicon atoms. Particularly preferably, the compatibilizing functionality is an epoxide group, e.g

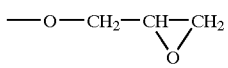

a group.

Thus, a particularly preferred example of R' is a 3-glycidyfoxypropyl group. A particulary preferred example for the silicon-containing precursor is (3-glycidyloxypropyl)-trimethoxysilans.

The aluminum-containing precursor is preferably a compound of the formula (II):

$$Al(OR)_3 \quad (II)$$

wherein
each R is indepenendly a straight-chain or branched, substituted or unsubstitued $C_1$–$C_8$, preferably $C_1$–$C_6$ alkyl group, e.g. a methyl, ethyl, propyl or butyl group.

A particularly. preferred example for an aluminum-containing precursor is Al(sec-butoxide).

Step b) of the process according to the invention comprises reacting the precursor mixture whereby a sol is formed. In this step water or an aqueous solution is used to hydrolyze the alkoxy group-containing precursors forming a sol comprising Si—OH and Al—OH groups. Preferably, the hydrolysis of the precursors is carried out under acid-conditions, e.g. In the presence of 0.01 N HCl.

Step c) of the process according to the invention comprises adding a polyalkylene oxide-containing polymer and a lithium salt to the mixture from step a) and/or the sol from step b). The addition of the polyalkylene oxide containing polymer and the lithium salt may occur before and/or after the reaction of the precursors-to the sol. Preferably, the polymer and the lithium salt are added -after the formation of the sol. The polymer and the sol may be added in a solvent in which both components are soluble, preferably an organic solvent, e.g. a chlorinated hydrocarbon or a linear or cyclic ether, particularly preferably chlorform, tetrahydrofuran or mixtures thereof.

The polyalkylene oxide-containing polymer is preferably a polyethylene oxide containing polymer having a molecular weight in the range of from about 100 g/mol to about 10.000 g/mol, more preferably from about 300 g/mol to about 2.000 g/mol. In one preferred embodiment of the invention the polymer is a polyethylene homopolymer. In another preferred embodiment of the invention the polymer is a block copolymer comprising polyethylene oxide blocks and hydrophobic blocks wherein these hydrophobic blocks may be selected from the group consisting of polyisoprene, polybutadiene, polymethylsiloxane, methylphenylsiloxane, polyacrylates of $C_3$–$C_4$ alcolhols, polymethracrylates of $C_3$–$C_4$ alcohols, hydrogenated polyisoprene, polybutadiene and mixtures thereof. Preferably these hydrophobic blocks have a glass transition temperature $\leq$ room temperature, i.e. 25° C., particularly preferably $\leq$0° C. and most preferably $\leq$ –25° C. Examples of these types of polymers are given, e.g. in WO99/12994, which is incorporated herein by reference.

The lithium salt may be an inorganic or organic lithium salt, wherein organic lithium salts are preferred. More preferably, the lithium salt is selected from lithium carboxylates and lithium sulfonates. The organic lithium salts may comprise halogenatic organic anions, particularly fluorinated organic anions such as the trifluoromethylsulfonate (triflate) anion.

Step d) of the process according to the invention comprises reacting the mixture from c) whereby a solid organic-inorganic hybrid polymer electrolyte is obtained. This step comprises the forming of Si—O—Si bonds, whereby a three-dimensional network of Si atoms is formed. Further, the reaction preferably comprises the removal of any volatile constituents from the reaction mixture, e.g. by heating and/or vacuum treatment. For details it is referred to WO99/12994.

Further, the present invention refers to a solid hybrid polymer electrolyte which is obtainable by the process as described above. The solid hybrid polymer electrolyte of the invention has a three-dimensional network structure comprising Si atoms bound to 1, 2 or 3 bridging oxygens (i.e. oxygens forming Si—O—Si bridges), wherein the three-dimensional network structure further contains aluminate ions, lithium cations and a polyalkylene oxide-containing polymer. The molar ratio of Si and Al atoms is preferably in the range from about 99:1 to about 1:1, more preferably from about 2:1 to about 1:1. The molar ratio of Li ions to aluminate anions is preferably in the range of from 0.4 to about 3, more preferably from about 1.3 to about 2. The weight ratio of polyalkylene oxide-containing polymers to the precursor compounds is preferably in the range of from about 0.21:1 to about 1.2:1 more preferably from about 0.7:1 to about 1:1.

Further, it is preferred that at least about 30% to 40% of the Si atoms in the network structure are bound to 3 bridging oxygens. The Al atoms are present as aluminate anions, which may comprise—4 and/or—6-fold coordinate Al atoms. Preferably, about 35–65%, more preferably about 50% of the Al are 4-fold coordinate atoms.

The polyalkylene-containing polymer in the polyelectrolyte is non-crystalline at room temperature. Preferably, the polymer has a glass transition temperature of less than about –20° C., more preferably of less than about –30° C.

Further, it i preferred that the polymer electrolyte has a mechanical modulus (as determined by dynamic spectroscopy) of at least about 5×106 Pa, more preferably of at least about $10^7$ Pa at room temperature. The polymer electrolyte has preferably a conductivity as measured according to dielectric spectroscopy and impedance spectroscopy of at least about $10^{-5}$ S/cm at room temperature, more preferably up to about $10^{-4}$ S/cm or more.

The polymer electrolyte may be in the form of an anisotropic solid, e.g. a monolith or a film. The polymer electrolyte, however, may be in the form of a nanostructure such as a plate and/or a rod or cable. The forming of these nanostructures is described in detail in WO99/12994.

Moreover, the invention is explained by the following figures and examples.

FIG. 1:

DC conductivity of solid hybrid polymer (ShP) electrolyte networks as a function of the molar ratio of Al-GLYMO composite to PEO (filled squares). Here the salt content is fixed at about 14.3 ether oxygens per lithium. The exponential dependence on PEO content is consistent with the view that the Al-GLYMO composite provides a stabilizing network that supresses crystallization but does not participate directly in conduction. On the right the hybrid p cursors are shown. The inset graph shows the dependence of conductivity on lithium content for fixed hybrid to PEO ratio of 0.22 (filled circles). The typical maximum at about 0.07 is observed, again suggesting t at the conductivity in this composite is governed by the same principles as n pure PEO.

FIG. 2a;

DC conductivity of the composite material as a function of temperature. Typical WLF behaviour is observed. The data demonstrate the high temperature stability of the material against crystallization.

FIG. 2b:

Storage modulus G' from dynamic mechanical spectroscopy measurements as a function of temperature. Heating (black) and cooling (grey) curves exhibit exactly the same behaviour showing that the increase in modulus above the glass transition is an intrinsic property of the network.

FIG. 3:

NMR measurements on the best conducting samples: (a) $^{29}$Si NMR spectrum of a SHyP electrolyte network. The strong high-field resonance is due to silicon bonded to three bridging oxygens ($T^3$ groups as shown in the inset), and indicates that the hybrid forms a three-dimensionally connected network. (b) $^{27}$Al spectrum of the same sample. The strong resonance at 60 ppm is due to four-fold coordinate aluminum (as indicated), showing the presence of anionic sites in the material structure.

EXAMPLE

The hybrid material is made in two steps by a process generally disclosed in Templin et al. (Science 278 (1997), 1795–1798). First, commercially available (3-glycidyloxypropyl-)-trimethoxysilane (GLYMO) and aluminum sec-butoxide are hydrolyzed in 0.01 N HCl following a recently described procedure. In the second step, the resulting sol is blended with PEO (molecular weight 600 g/mol, polydispersity index 1.2) and lithium triflate, using a 1:1 mixture of tetrahydrofuran and $CHCl_3$ as the solvent. The organic solvent is removed at modest temperatures followed by heat treatment. The result is an organic-inorganic hybrid network blended at the molecular level with PEO and the lithium salt and exhibiting remarkable mechanical properties.

Oligoethylene oxide moieties generated through the sol-gel process from GLYMO make this particular hybrid especially compatible with PEO. Inclusion of the aluminum component, present to a significant exent in anionic form, makes the hybrid different from other recently developed silica-sol derived electrolytes and is critical to its electrochemical performance.

We characterized the resulting composite materials with differential scanning calorimetry (DSC), electrical conductivity and transference number measurements dynamic-mechanical spectroscopy and nuclear magnetic resonance (NMR), for different hybrid/PEO and lithium/PEO ratios, The DSC results show a glass transition at about −34° C., for the lowest hybrid/PEO ratios studied 20 mol %), which increases to about −15° C. and broadens substantially as the hybrid content nears 100%. $T_g$ also increases with Li/PEO ratio, though less dramatically than in pure polymer electrolytes. Finally, DSC and mechanical measurements showed no evidence of a crystallization transition, for any one of the compositions studied. Thus addition of modest amounts of the hybrid material is sufficient to suppress PEO crystallization completely for any of the compositions studied even for cooling cycles down to −100° C.

Figure 2A:
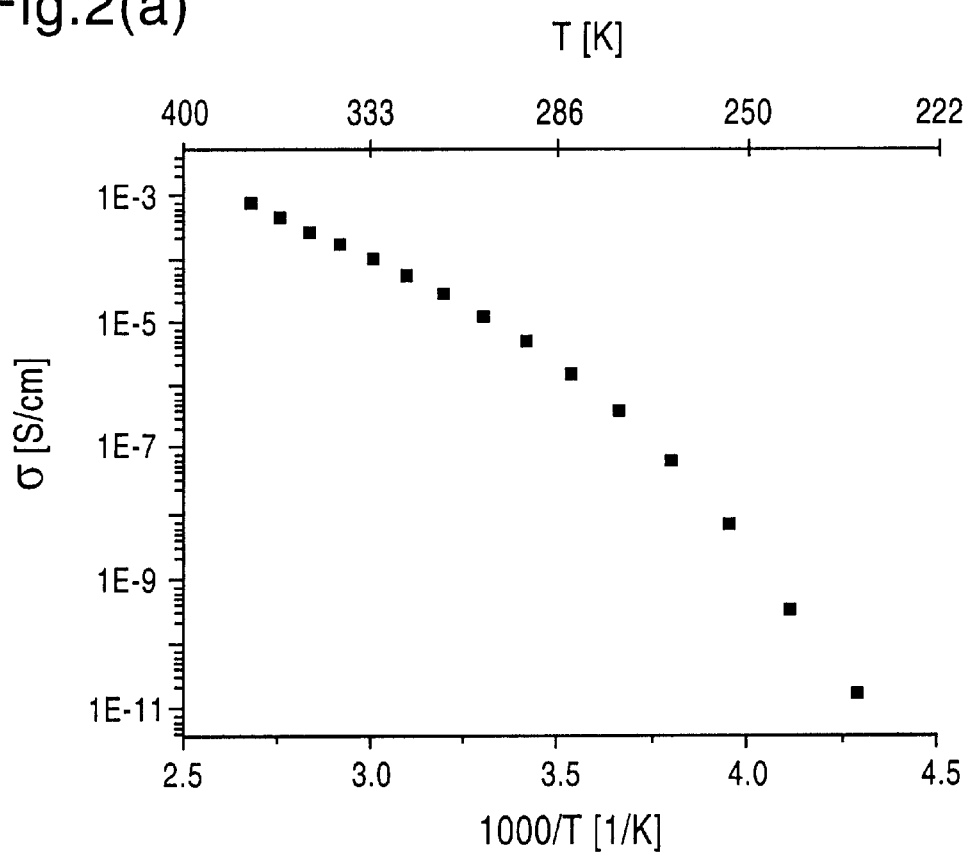

Electrical conductivity was determined both by measuring the real and imaginary parts of the dielectric constant as a function of frequency, and by the more common procedure of measuring the complex impedance. The ambient temperature DC conductivity as a function of composition is shown in FIG. 1. For a fixed hybrid to PEO ratio (inset) the dependence of conductivity an lithium shows a maximum near 12–14PEO oxygen/$Li^+$. For fixed $Li^+$content, the SHyP electrolyte networks show increasing conductivity at ambient temperature for decreasing hybrid content which is consistent with the $T_g$ dependence mentioned above and values of $10^{-6}$ S/cm are obtained at 20 mol % hybrid/PEO ratio. The temperature dependence of such a material is shown in FIG. 2a. Conductivity increases as the temperature is increased reaching $10^{-4}$ S/cm at about 60° C. The overall temperature dependence is well described by a WLF equation of polymer motion at the glass transition (Ferry, Viscoelastic Properties of Polymers, 3rd edition, John Wiley & Sons, Inc. New York 1980).

The lithium cation transference numbers were measured by the steady state current technique (Bruce and Vincent, J. Electroanal. Chem, 225 (1987), 1; Reiche at al. Electrochimica Acta 43 (1998), 1429–1434), and yielded values that increased with increasing organic-inorganic hybrid fraction. This increase Indicate the importance of the added Lewis acid sites. Transference numbers around 0.7 were found, for a sample with hybrid to PEO ratio of 0.42, and, in the samples with highest conductivity, a transference number of 0.53.

Figure 2B:
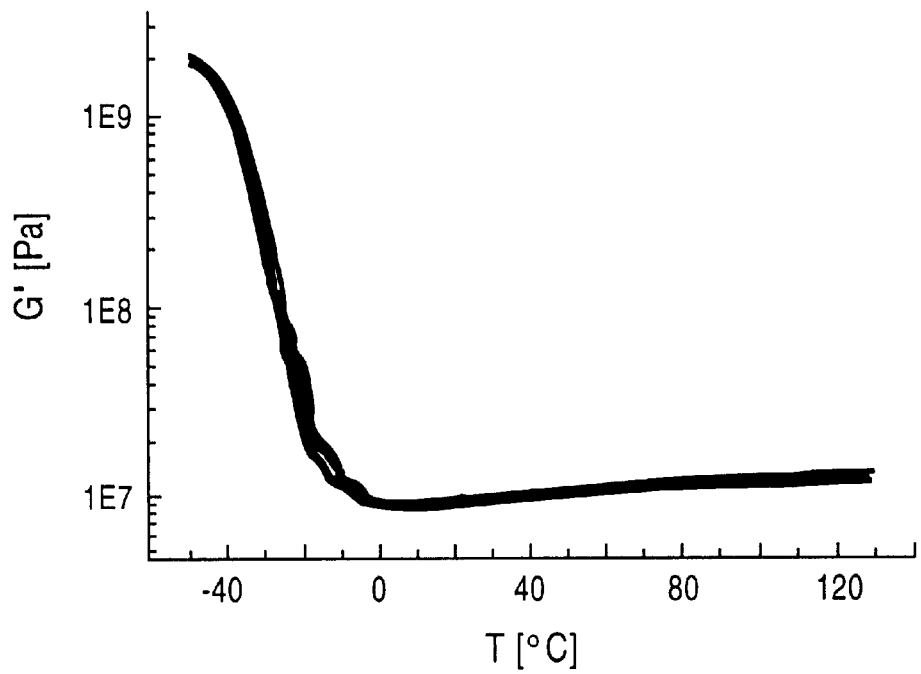

Dynamic-mechanical measurements as a function. of temperature were performed on the best conducting samples. A pronounced drop in mechanical modulus from about $10^9$ Pa to $10^7$ Pa was observed at −35° C., corresponding to the PEO glass transition (FIG. 2b). Above this value the modulus shows a moderate linear increase with temperature up to 140° C. revealing typical polymer network behaviour with entropic elasticity (Ferry, supra). Thus in the temperature range of typical applications, this material has the mechanical strength of a rubbery material.

Figure 3A:
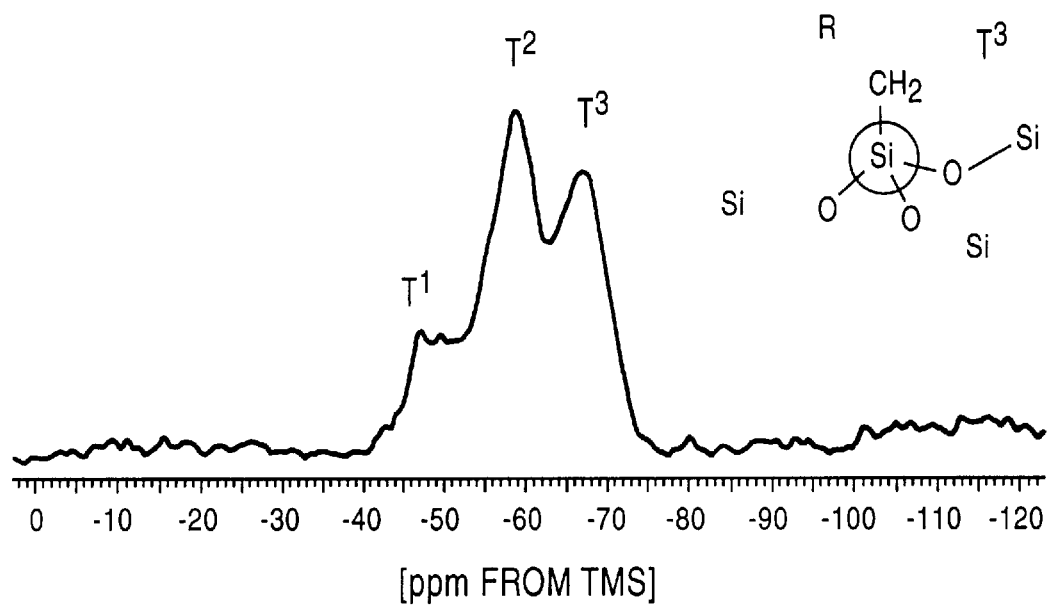
Figure 3B:
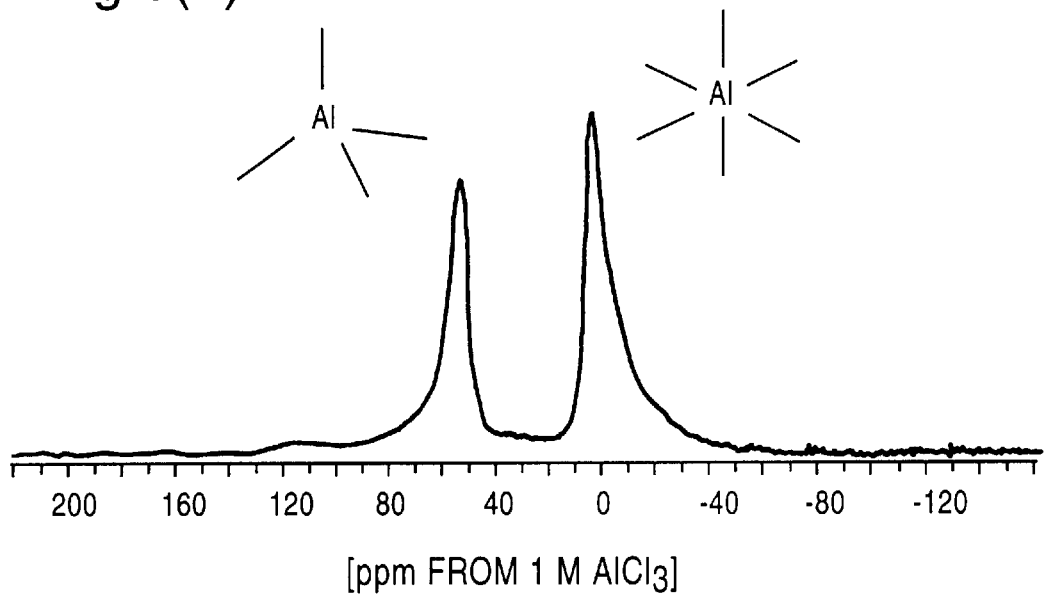

The structure and local dynamics of the SHyP electrolyte networks were deduced from NMR spectroscopy (FIG. 3). All of the $^{28}$Si spectra show the three distince features, assigned to silicon bound to one, two, or three bridging oxygen (so-called $T^{17}$ groups) (Templin et al., Adv. Meter. 9 (1997), 814–817). The large fraction of $T^3$ units shows that the hybrid material is is a three-dimensional network, consistent with the dynamic mechanical measurements. The $^{27}$Al spectra show both 4-fold and 6-fold coordinate aluminum (FIG. 3). While exact quantification is difficult, the spectra indicate that about half the aluminum sites are 4-fold coordinate. Such sites are of the form $AlO_{4/2}$, and thus provide a source of rigidly fixed conterions for the cations.

Polymer dynamics in the materials were probed using the Wideline Separation (WISE) NMR experiment (Schmidt-Rohr and Spiess: Multidimensional Solid State NMR and Polymers Academic Press Ltd., London 1994). The protons bound to the carbon next to silicon give a signal reflecting a relatively static local environment, while those bound to oxygen-bound carbon yield a two-component lineshape, indicating mobile and immobile fractone. Since both the hybrid and the PEC contribute to the latter signal, but only to the hybrid to the former, it is clear that the hybrid provides rigid domains dispersed through the mobile PEO polymer. It is the oligoethylene oxide fraction in the hybrid that permits the intimate mixing with the PEO, while the dispersion of rigid domains is likely the mechanism that suppresses crystallization of the PEO.

Finally, the aluminum-GLYMO hybrid is compatible with block copolymers 6 composed of PEO and polyisoprene (Pl-b-PEO), selectively swelling the PEO block (Teamplin et al., Science 278 (1997), 1796–1798; Ulrich-et al., Adv. Mater. 11(1999), 141–146; De Paul et al., J. Am. Chem. Soc. 121 (1999), 5727–5736). Incorporation of lithium triflate does not change this. behaviour, and we were thus able to prepare Pl-b-PEO/Al-GLYMO/Li composites. These composites are nano-structured, with morphologies corresponding to diblock copolymer/homopolymer blends. Lamellar and hexagonal rod morphologies were prepared and verified by Small Angle X-ray Scattering, for different Pl-b-PEO+ Hybrid compositions. $^7$Li NMR of the nano-structured materials showed a single motionally narrowed resonance, with a full width at half-maximum (FWHM) comparable to that in the unstructured SHyP electrolyte network conductors, indicating similar cation mobility in the nano-structured materials. Dissolution of such bulk structures leads to individual nano-cylinders which are covered by a thin insulating Pl layer thus making ion conducting 'nano-cables' accessible.

Thus, the present SHyP electrolyte network provides a novel type of lithium ion conductor with an unprecedented combination of properties: simple preparation from commercially available components, no PEO crystallization even for low temperatures, remarkably high ion conductivity and transference numbers, excellent mechanical strength and nanostructurability.

What is claimed is:

1. A process for preparing a solid hybrid polymer electrolyte comprising the steps:
    a) forming a mixture comprising at least one silicon-containing precursor and at least one aluminum-containing precursor,
    b) reacting the mixture from a) whereby a sol is formed,
    c) adding a polyalkylene oxide-containing polymer and a lithium salt to the mixture from step a) and/or to the sol from step b) wherein the polyalkylene oxide-containing polymer has a molecular weight in the range of from 100 to 10,000 g/mol, and
    d) reacting the mixture from c) whereby a solid organic-inorganic hybrid polymer electrolyte is obtained.

2. The process of claim 1, wherein said silicon-containing precursor is a component of the formula (I)

$$(R')_n Si(OR)_m \qquad (I)$$

wherein
    each R' is independently a straight-chain or branched, $C_1$–$C_{10}$ alkyl group containing a compatibilizing functionality each R is independently a straight-chain or branched, substituted or unsubstituted $C_1$–$C_8$ alkyl group
    n is 1 or 2 and
    m is 3 or 2, with the proviso that n+m is 4.

3. The process of claim 2 wherein the compatibilizing functionality is

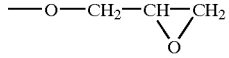

a group.

4. The process of claim 3 wherein R' is a 3-glycidyloxylpropyl group.

5. The process of claim 1 wherein the silicon-containing precursor is (3-giycidiloxylpropyl)-trimethoxysilane.

6. The process of claim 1 wherein step b) comprises a hydrolysis under acid conditions.

7. The process of claim 1 wherein the polymer and the lithium salt are added in an organic solvent.

8. The process of claim 7 wherein the solvent is selected from the group consisting of chloroform, tetrahydrofuran and mixtures thereof.

9. The process of claim 1 wherein the polymer is a polyethylene oxide-containing polymer.

10. The process of claim 9 wherein the polymer is a polyethylene oxide.

11. The process of claim 1 wherein the lithium salt is an organic lithium salt.

12. The process of claim 11 wherein the lithium salt is selected from lithium carboxylates and lithium sulfonates.

13. The process of claim 11 wherein the organic lithium salt comprises a halogenated organic anion.

14. The process of claim 13 wherein the organic lithium salt comprises a fluorinated organic anion.

15. The process of claim 14 wherein the organic lithium salt is lithium trifluoromethyl sulfonate.

16. A solid hybrid polymer electrolyte obtainable by the process of claim 1.

17. The polymer electrolyte of claim 16 having a three-dimensional network structure comprising Si atoms bound to 1, 2 or 3 bridging oxygens, wherein at least about 30% to 40% of the Si atoms are bound to 3 bridging oxygens.

18. The polymer electrolyte of claim 16 comprising 4- and, 6-fold coordinate Al atoms, wherein about 35–65% of the Al atoms are 4-fold coordinate Al atoms.

19. The polymer electrolyte of claim 16 wherein the polyalkylene containing polymer in the electrolyte has a glass transition temperature of less than about −20° C.

20. The polymer electrolyte of claim 16 having a mechanical modulus of at least about $10^7$ Pa.

21. The polymer electrolyte of claim 16 having a conductivity of at least about $10^{-5}$ S/cm at room temperature.

22. The polymer electrolyte of claim 16 in the form of nanostructure.

23. The polymer electrolyte of claim 22 wherein the nanostructure are plates or rods.

24. A process for preparing a solid hybrid polymer electrolyte comprising the steps:
    a) forming a mixture comprising at least one silicon-containing precursor and at least one aluminum-containing precursor, b) reacting the mixture from a) whereby a sol is formed, c) adding a polyalkylene oxide-containing polymer and a lithium salt to the mixture from step a) and/or to the sol from step b) and d) reacting the mixture from c) whereby a solid organic-inorganic hybrid polymer electrolyte is obtained;

wherein the aluminum-containing precursor is a compound of the formula (II)

$$Al(OR)_3 \tag{II}$$

wherein
each R is independently a straight-chain or branched, substituted or unsubstituted $C_1$–$C_8$ alkyl group.

25. The process of claim 24 wherein the precursor is Al (sec-butoxide)$_3$.

26. A process for preparing a solid hybrid polymer electrolyte comprising the steps:

a) forming a mixture comprising at least one silicon-containing precursor and at least one aluminum-containing precursor, b) reacting the mixture from a) whereby a sol is formed, c) adding a polyalkylene oxide-containing polymer and a lithium salt to the mixture from step a) and/or to the sol from step b) and d) reacting the mixture from c) whereby a solid organic-inorganic hybrid polymer electrolyte is obtained;

wherein the polymer is a polyethylene oxide-containing polymer that is a block copolymer comprising polyethylene oxide blocks and hydrophobic blocks.

27. The process of claim 26 wherein the hydrophobic blocks are selected from the group consisting of polyisoprene, polybutadiene, polymethylsiloxane, methylphenylsiloxane, polyacrylates of $C_3$–$C_4$ alcohols, polymethracrylates of $C_3$–$C_4$ alcohols, hydrogenated Polyisoprene, polybutadiene and mixtures thereof.

* * * * *